Jan. 23, 1934.  H. V. ATWELL  1,944,857
QUICK FREEZING PROCESS AND REFRIGERANT
Filed June 19, 1931
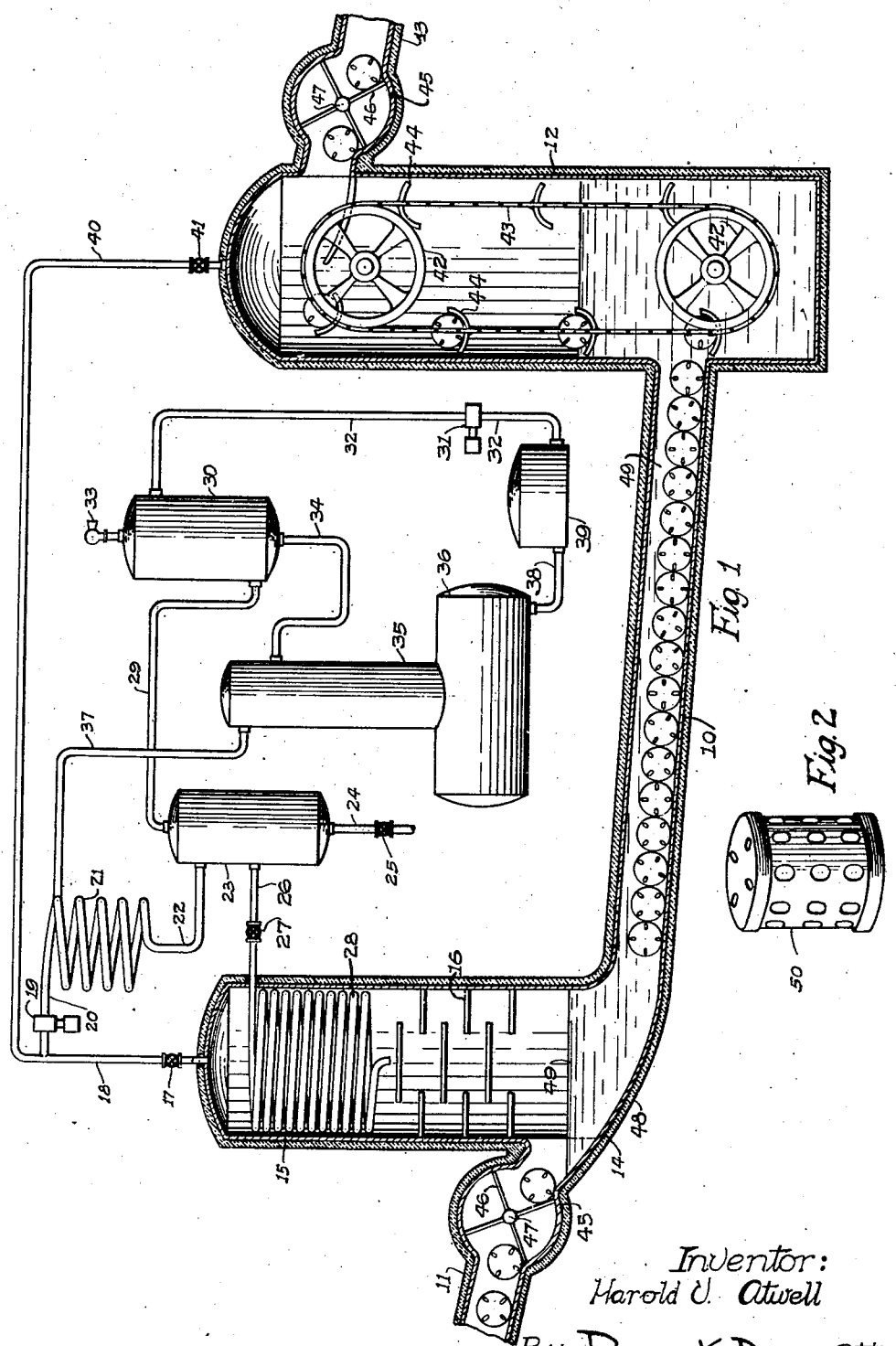
Inventor:
Harold V. Atwell
By Bruce K. Brown Atty Patented Jan. 23, 1934

1,944,857

UNITED STATES PATENT OFFICE 1,944,857

QUICK FREEZING PROCESS AND REFRIGERANT

Harold V. Atwell, Hammond, Ind., assignor to Standard Oil Company, Chicago, Ill., a corporation of Indiana Application June 19, 1931. Serial No. 545,541

6 Claims. (Cl. 62—104)

This invention relates to a quick freezing process for foods and to a refrigerant for use therein.

The object of my invention is to provide an improved quick freezing process for preserving foods such as fresh fruits, vegetables and meats whereby the ice crystals formed in the foods are so small that they do not rupture the cell walls. By means of this process fresh vegetables, fruits and meats may be frozen, stored for an indefinite period of time, and finally thawed without injuring their appearance, texture or flavor.

Heretofore quick freezing processes have employed indirect heat exchange means, which are thermally inefficient, and refrigeration has been accomplished by expensive plants wherein brine absorbs heat from the food by indirect contact and then delivers the heat to vaporize liquefied ammonia also by indirect contact. An object of my invention is to avoid indirect contact and to obtain quick freezing by immersing the foods directly into a liquid refrigerant. A further object is to provide a thermally efficient system and to avoid the necessity of conducting the heat from the food through metal walls. A further object is to increase the rate of cooling and to thereby obtain a frozen product of higher quality.

A further object is to provide an improved refrigerant and an improved system for handling said refrigerant. Other objects will be apparent from the following detailed description.

I have discovered that certain light hydrocarbons, such as propane, are excellent refrigerants and are at the same time inert and non-injurious to food. In practicing my process I obtain refrigeration by direct vaporization of the refrigerant; at normal pressures propane is particularly suitable but other hydrocarbons may be used by employing suitable variations in pressure. When an article is dipped into liquid propane at a temperature of about —38° C. there is direct and exceptionally efficient contact between the food product and the refrigerant. There is also a natural agitation of the refrigerant which very greatly increases the heat transfer rate. This advantage results from the rapid boiling of the liquid in contact with the food.

An important advantage of my invention lies in the direct use of the latent heat of evaporation for the quick freezing of food stuffs. When heat must be transferred from the brine to a metal and then from the metal to the food, that portion of the brine in contact with the metal becomes warmed and acts to insulate the metal from the colder brine. By using direct contact the refrigerant adjacent the food is vaporized and immediately expelled, causing agitation and immediate contact with other portions of the cold refrigerant.

The invention will be more clearly understood from the following detailed description of a preferred embodiment which is illustrated in the accompanying drawing wherein:

Figure 1 is a vertical section partly diagrammatic, illustrating my improved quick freezing system and Figure 2 is a perspective of my improved container.

My apparatus consists generally of a closed system for contacting food with liquefied refrigerant. The food is introduced through a vapor tight gate, contacted with the liquid, and discharged from the system through a similar vapor tight gate. The refrigerant is compressed, condensed, separated from water and air, precooled and reintroduced into the closed system.

The closed system may consist of an inclined conduit 10 leading from an enclosed inlet passage 11 to elevator tower 12, which delivers frozen products to enclosed discharge passage 13. Adjacent the inlet passage 11 the inclined conduit is enlarged as indicated at 14, and above this enlarged portion I provide a tower 15. In the base of this tower I provide suitable baffles 16, to serve as entrainment arresters, reflux means and precooling means for make up refrigerant, as will be hereinafter described.

Refrigerant vapors are removed from the top of tower 15 through regulating valve 17 and pipe 18, compressed in compressor 19 and thence conducted in pipe 20 to condenser 21, wherein the compressed vapors are liquefied. Coils 21 discharge through pipe 22 into separator 23, the water being withdrawn from the base of the separator by pipe 24 in amounts regulated by valve 25, and liquefied refrigerant being reintroduced through pipe 26 in amounts regulated by expansion valve 27 into heat exchanger coil 28. In this coil the vapors leaving tower 15 extract heat from the entering liquid, and the liquid is finally reduced to the refrigeration temperature by direct expansion on baffle plates 16. If propane is used as a refrigerant at normal pressures, the temperature of the liquid refrigerant will be about —38° C. For most purposes a temperature of —25 to —30° C. is sufficient; in other words, I have found that by using direct expansion I may employ slightly higher temperatures than would otherwise be possible. The pressure of my system will vary with the refrigerant used and will be regulated in most cases to maintain the liquefied refrigerant at a temperature of about −20 to −35° C.

Some air may be constantly introduced into the system through the inlet and outlet passages and it is, therefore, necessary to constantly remove this air from the system. The air, together with a certain amount of hydrocarbon vapors, is discharged from the top of separator 23 through pipe 29 which introduces it into absorber 30. Cold, refined petroleum oil, preferably a light technical white oil, is introduced by means of pump 31 and pipe 32 into the top of the absorber 30 and is passed countercurrently in said absorber with the gases introduced by pipe 29. This absorber oil, which is usually called "lean oil", absorbs the petroleum vapors so that the air may be discharged through relief valve 33 without wasting appreciable amounts of refrigerant. After absorption the oil is passed through pipe 34 to an intermediate point of fractionator 35 of shell still 36. The light petroleum hydrocarbons or refrigerants are conducted from the top of the fractionator through conduit 37 to condenser coil 21, wherein they are mixed and condensed with other refrigerant vapors. Lean oil from the bottom of still 36 is conveyed by pipe 38 to lean oil storage tank 39, from which it is withdrawn by pipe 32 and pump 31 as hereinabove described.

A pipe 40 connects the top of tower 12 with conduit 18 and permits the discharge of refrigerant vapors in amounts regulated by valve 41. From the above description it will be seen that pipes 18 and 40 in conjunction with valves 17 and 41 control the liquid levels at the ends of inclined conduit 10.

In tower 12 I provide spaced pulleys 42, over which is trained a belt 43 which operates a series of buckets or carriers 44. Products are discharged from the top of this tower through discharge passage 13. The conveyor per se forms no part of this invention and it is therefore only shown diagrammatically. Any type of conveyor may be used.

In both the inlet and discharge passages I provide vapor tight gates 45 which may consist of a cylindrical casing cooperating with spaced vanes 46 which turn on axis 47. These devices act as revolving doors to permit articles to pass therethrough one at a time and to seal the inlet and outlet passages so that refrigerant loss will be minimized.

The entire structure between inlet and outlet discharge passages is heavily lagged or insulated by asbestos or other suitable material 48, this insulation extending, of course, around tower 15.

The refrigerant 49 is preferably a light petroleum hydrocarbon, such as propane. I do not limit myself to propane, however, and I may use an inert light hydrocarbon which has a boiling point within an operative range. For ordinary purposes I may define the light hydrocarbon refrigerant by its vapor pressure and it would include light hydrocarbons having a vapor pressure between that of ethane and pentane inclusive. I might also use other light hydrocarbons, such as dimethyl ether, provided the hydrocarbon does not undergo a chemical change or in any manner contaminate the food, and provided it has the necessary boiling point.

The foods to be treated by my process include generally all classes of fresh fruits, vegetables and meats. In my preferred embodiment I will describe the quick freezing of fresh fruits, such as strawberries. These berries may be ripened before they are picked and the ripe fruit may be packed in perforated containers 50 of pint or quart capacity (see Figure 2). These containers may be of cardboard or other cheap material, and they may be sized with sodium silicate or the like to render them impervious to the refrigerant. In the preferred embodiment the containers are cylindrical and are perforated both around their circumference and on their ends. The containers packed with fruit are rolled down inlet passage 11 and are admitted one at a time by gate 45 into the enlarged portion 14 of incline conduit 10. The liquid refrigerant passes through the apertures of container 50, coming in direct contact with the fruit, and quickly absorbs the heat from said fruit, the sensible heat of the strawberries causing the vaporization or boiling of the refrigerant which, in turn, causes efficient agitation and contact of food with refrigerant. The fruit is frozen so quickly that ice crystals do not have time to grow or, in other words, the cellular structure of the fruit remains unchanged. The fruit is maintained in contact with the refrigerant for several minutes while it rolls down incline conduit 10. The containers are then removed from the liquid refrigerant by carriers 44 and as they are lifted upwardly in tower 12, excess refrigerant is drained therefrom and volatilized refrigerant is withdrawn through valve 41 and pipe 40. Receptacles containing frozen fruit are then discharged through passage 13 and discharge gate 45. It is understood that additional drying means may be used to insure the removal of all refrigerant from the frozen fruit. For instance, the discharge passage 13 may be a closed insulated conduit and cold air may be blown therethrough for removing refrigerant vapors, the refrigerant being stripped from the air in absorber tank 30. The air should, of course, be dry to avoid the accumulation of frost on the food or the package.

While I have described an apparatus and a method for the quick freezing of fruit, it is understood that by simple variations the same may be applied to vegetables, meats or other foods.

The frozen food may be maintained in its frozen conditions for indefinite periods of time, and it may be stored, transported and finally sold in the same perforated containers. These containers are particularly efficient in modern refrigeration systems wherein solid carbon dioxide (dry ice) is used as a refrigerant. The cold carbon dioxide gas is in direct contact with the fruit itself. Furthermore, when the fruit is ready for consumption it may be thawed and marketed in the same containers.

As above stated, the admission of relatively warm food into the refrigerant causes a violent ebullition of refrigerant vapors. These vapors impinge against baffle plates 16 which act as entrainment arresters and as a reflux to cause the condensation of part of said vapors. The remaining vapors cool incoming refrigerant in coils 28 and finally leave tower 15 through pipe 18; they are compressed by compressor 19, condensed in coil 21, degasified in separator 23 and finally reintroduced into the system through pipe 26. It should be noted that the refrigerant in pipe 26 is at a higher pressure than the refrigerant in the rest of the system, so that when it is introduced into tower 15 it must be refrigerated by partial expansion and evaporation. Baffle plates 16 also serve as a precooler for incoming refrigerant.

As above stated the air, which is instantly admitted into the system through gates 45, is removed through pipe 29 and absorber 30, the system absorbing the refrigerant as above described.

While I have defined a preferred embodiment of my invention it is understood that I do not limit myself to the details therein set forth. The closed system may be in the form of a large tank. Various methods may be used for introducing, contacting, drying and discharging the foodstuff. The liquefaction of the refrigerant may be effected by refluxing refrigerant vapors in tower 15 or an equivalent structure in contact with ammonia expansion coils or other cooling means. Various other modifications may be made by those skilled in the art without departing from my invention.

I claim:

1. In apparatus for freezing food, a closed system comprising a container for a liquid refrigerant, means for regulating the pressure in said container whereby the refrigerant boils at about −20 to −35° C., and sealed gates for passing food into and out of said container, whereby the pressure in the container is not materially altered by the introduction of food therein or the removal of food therefrom.

2. In apparatus of the class described, means for contacting food with liquid propane, means for refluxing propane vapors which are evolved by contact with the food, and means for compressing, liquefying and precooling propane vapors to maintain a substantially constant volume or refrigerant.

3. In combination, a liquid propane container, means for introducing food into said liquid propane, means for removing said food from said liquid propane, means for liquefying the propane which is vaporized on contact with said food, means for removing impurities from said liquefied propane and means for returning said propane to the system.

4. In apparatus of the class described, a closed system comprising an inclined conduit, an inlet passage leading thereto, a tower adjacent said inlet passage, reflux means in said tower, an outlet passage leading from said system and elevating means between said inclined conduit and said discharge passage.

5. In apparatus of the class described, a closed system comprising a plurality of towers, a liquid conduit connecting the bases of said towers, a vapor conduit connecting the top of the towers and valves in said vapor conduit for regulating the relative height of liquid in the base of said towers.

6. In apparatus of the class described, a closed system comprising an inlet passage, a sealed gate in said passage, a container for a light hydrocarbon refrigerant arranged to receive food from said inlet passage, an elevator for lifting said food from said refrigerant to a discharge passage, a discharge passage, a sealed gate in said discharge passage, a reflux means above said container, means for liquefying refrigerant vapors, means for removing air from refrigerant vapors, and means for precooling liquefied refrigerant.

HAROLD V. ATWELL.